United States Patent
Ko

(10) Patent No.: US 6,486,925 B1
(45) Date of Patent: Nov. 26, 2002

(54) CHANNEL MANAGING APPARATUS AND METHOD FOR DIGITAL/ANALOG TV

(75) Inventor: Jae-Woo Ko, Kyongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/310,093

(22) Filed: May 12, 1999

(30) Foreign Application Priority Data

May 15, 1998 (KR) .............................. 98-17603

(51) Int. Cl.[7] .............................. H04N 5/50; H04N 5/46; H04N 7/00; H04N 7/16; H04N 3/27; H04N 5/445; G06E 3/00
(52) U.S. Cl. ........................ 348/731; 348/732; 348/906; 348/465; 348/554; 348/555; 348/558; 725/49; 725/139
(58) Field of Search ................................. 348/906, 554, 348/555, 558, 731, 732, 10, 11, 460–465, 569; 455/6.2, 6.3, 3.2; 725/49, 139

(56) References Cited

U.S. PATENT DOCUMENTS

| | | | | |
|---|---|---|---|---|
| 5,661,526 A | * | 8/1997 | Hamamoto et al. | 348/465 |
| 5,900,912 A | * | 5/1999 | Nishigaki et al. | 348/460 |
| 5,956,097 A | * | 9/1999 | Nguyen et al. | 348/731 |
| 5,982,411 A | * | 11/1999 | Eyer et al. | 348/6 |
| 6,031,580 A | * | 2/2000 | Sim | 348/565 |
| 6,133,910 A | * | 10/2000 | Stinebruner | 345/327 |

* cited by examiner

Primary Examiner—John Miller
Assistant Examiner—Paulos Natnael
(74) Attorney, Agent, or Firm—Fleshner & Kim, LLP

(57) ABSTRACT

In a channel managing apparatus and method for a digital/analog TV, if a user selects a desired channel, a type of broadcasting corresponding to the channel selected by the user is automatically switched to tune the channel. The channel managing apparatus for a digital/analog TV includes a memory for storing tabled channel information of all the broadcasting signals including digital and analog broadcasting signals, a controller for extracting channel information corresponding to a channel selected by a user if the user selects the channel and for outputting a control signal to tune the corresponding channel, a first switching portion for selecting one of outputs of a digital broadcasting receiver and an analog broadcasting receiver, and a signal processing and display portion for processing and displaying output signals of the first switching portion. Since it is possible to tune a desired channel using a number key or a channel up/down key without selecting a separate input mode, the user can be provided with convenience.

20 Claims, 6 Drawing Sheets

CHANNEL MANAGING APPARATUS AND METHOD FOR DIGITAL/ANALOG TV

BACKGROUND OF THE INVENTION

1. Field of the Invention

The present invention relates to a TV, and more particularly, to a channel managing apparatus and method for a digital/analog TV.

2. Background of the Related Art

Generally, an analog TV has poor picture quality in case of a large size, and has a limited channel structure including 80 channel bands of very high frequency and ultra high frequency. For these reasons, the analog TV has a limitation as a unidirectional medium.

To solve this problem of the analog TV, there is provided a digital TV which provides clear picture quality by two times as compared with the analog TV. Moreover, the digital TV can use all the channel regions which were not previously available because there is no interference between adjacent channels.

However, to convert the current analog broadcasting to the digital broadcasting, it is necessary to convert all of broadcasting apparatuses and a TV receiver This requires much time and thus it is probably that there co-exist the analog broadcasting and the digital broadcasting for a certain time period.

It is therefore expected that there will be a trend to a digital/analog TV which is capable of receiving both analog signals and digital signals at the same time, until the digital broadcasting system is completely established. A system which receives different broadcasting systems such as the digital/analog TV and a satellite broadcasting TV is required to overcome various drawbacks which may obstruct broadcasting quality.

A channel managing apparatus and method for a related art digital/analog TV will be described with reference to the accompanying drawings.

FIG. 1 is a block diagram illustrating a channel managing apparatus for a related art digital/analog TV, and FIG. 2 is a flow chart illustrating a channel managing method for a related art digital/analog TV.

As shown in FIG. 1, the related art digital/analog TV includes a satellite tuner 1 for selectively receiving a certain frequency band among satellite broadcasting signals, a demultiplexer 2 for demultiplexing broadcasting signals received by the satellite broadcasting tuner 1 to image signal, voice signal and various control signals, an A/V decoder 3 for decoding voice signals and image signals output from the demultiplexer 2, an NTSC encoder 4 for encoding a digital image signal output from the A/V decoder 3 to an NTSC signal and outputting a luminous signal Y and a color signal C to be displayed on a TV or a monitor, a ground wave tuner 5 for selectively receiving a certain frequency band among analog ground wave broadcasting signals, an outer input portion 6 for inputting outer signals such as a VTR signal or audio signal, a switching portion 7 for selecting one of the output of the ground wave tuner 5 and the output of the outer input portion 6, a VCD processor 8 for processing a series of signals to display the output of the switching portion 7 on a screen, a display portion 9 for displaying the output of the VCD processor 8 on the screen, a controller 10 for outputting a control signal to the switching portion 7 to tune into a channel selected by a user, and a memory 11 for storing channel information of all the broadcasting signals.

The satellite broadcasting tuner 1 and the ground wave tuner 5 receive the satellite broadcasting or the analog ground wave broadcasting to select a desired channel.

The demultiplexer 2 outputs a corresponding signal only by a control signal of the channel selected by the user among signals output from the satellite broadcasting tuner 1. The A/V decoder 3 recovers and outputs image and voice signals among signals selectively output from the demultiplexer 2.

The NTSC encoder 4 encodes the digital image signal to an NTSC signal and then outputs the luminous signal Y and the color signal C to be displayed on a TV or monitor The switching portion 7 selectively outputs one of the outputs of the NTSC encoder 4, the ground wave tuner 5, and the outer input portion 6 in response to the control signal of the controller 10.

The VCD processor 8 processes image and deflection by inputting signals output from the switching portion 7, and the display portion 9 displays signals processed by the VCD processor 8 on the screen.

A channel managing method for the aforementioned digital/analog TV will be described with reference to FIG. 2.

First, an input mode is selected by key input operation of the user (S1). Subsequently, it is determined whether or not outer apparatuses have been selected (S2). As a result, if the outer apparatuses have been selected, an outer input mode is switched (S3). While, if the outer apparatuses have not been selected, it is determined whether or not the ground wave broadcasting mode has been selected (S4). If the ground wave broadcasting mode has been selected, the channel selected by the user is tuned (S5). If the ground wave broadcasting mode has not been selected, the satellite broadcasting mode is switched (S6). A channel is selected by manipulating a number key or a channel up/down key so that the selected channel is tuned (S7).

However, the related art digital/analog TV has a problem that causes the user inconvenience because a desired channel should be tuned after determining a type of broadcasting.

SUMMARY OF THE INVENTION

Accordingly, the present invention is directed to a channel managing apparatus and method for a digital/analog TV that substantially obviate one or more of the problems due to limitations and disadvantages of the related art.

An object of the present invention is to provide a channel managing apparatus and method for a digital/analog TV in which if a user selects a desired channel, a type of broadcasting corresponding to the channel selected by the user is automatically switched to tune the channel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a channel managing apparatus for a digital/analog TV according to the present invention includes a memory for storing tabled channel information of all the broadcasting signals including digital and analog broadcasting signals, a controller for extracting channel information corresponding to a channel selected by a user if the user selects the channel and for outputting a control signal to tune the corresponding channel, a first switching portion for selecting one of outputs of a digital broadcasting receiver and an analog broadcasting receiver, and a signal processing and display portion for processing and displaying output signals of the first switching portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
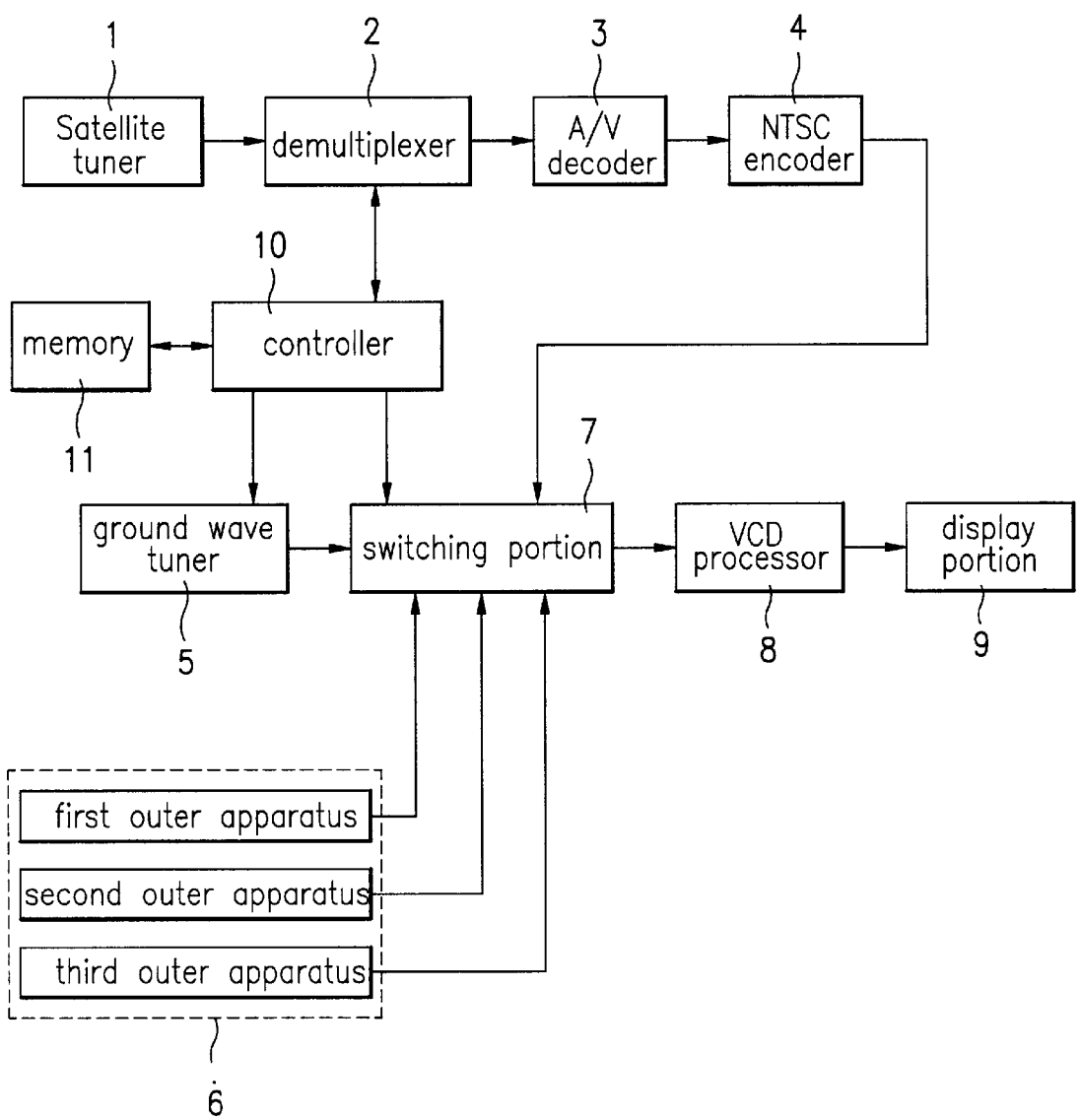
FIG. 1 is a block diagram illustrating a channel managing apparatus for a related art digital/analog TV.
Figure 2:
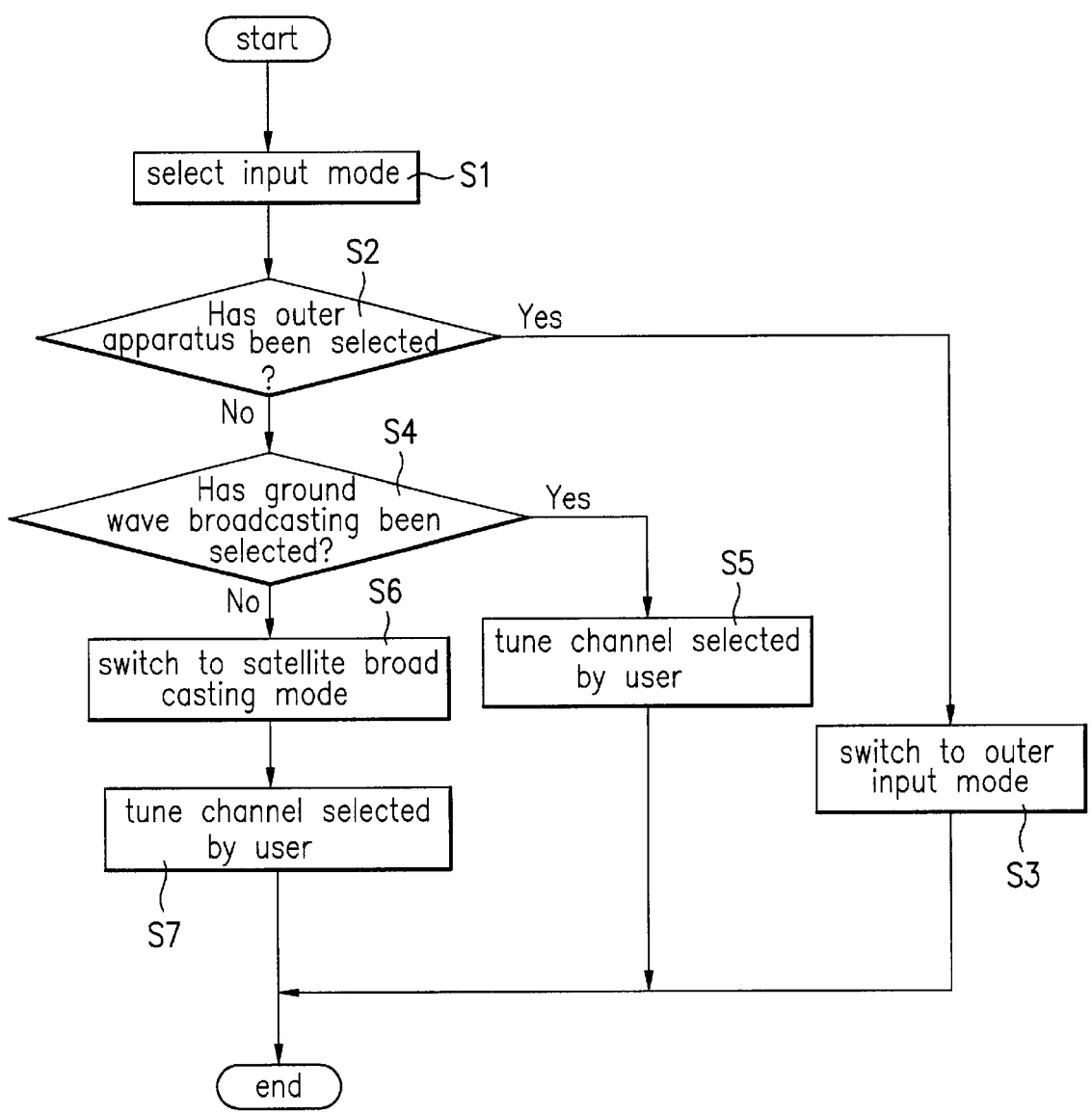
FIG. 2 is a flow chart illustrating a channel managing method for a related art digital/analog TV.
Figure 3:
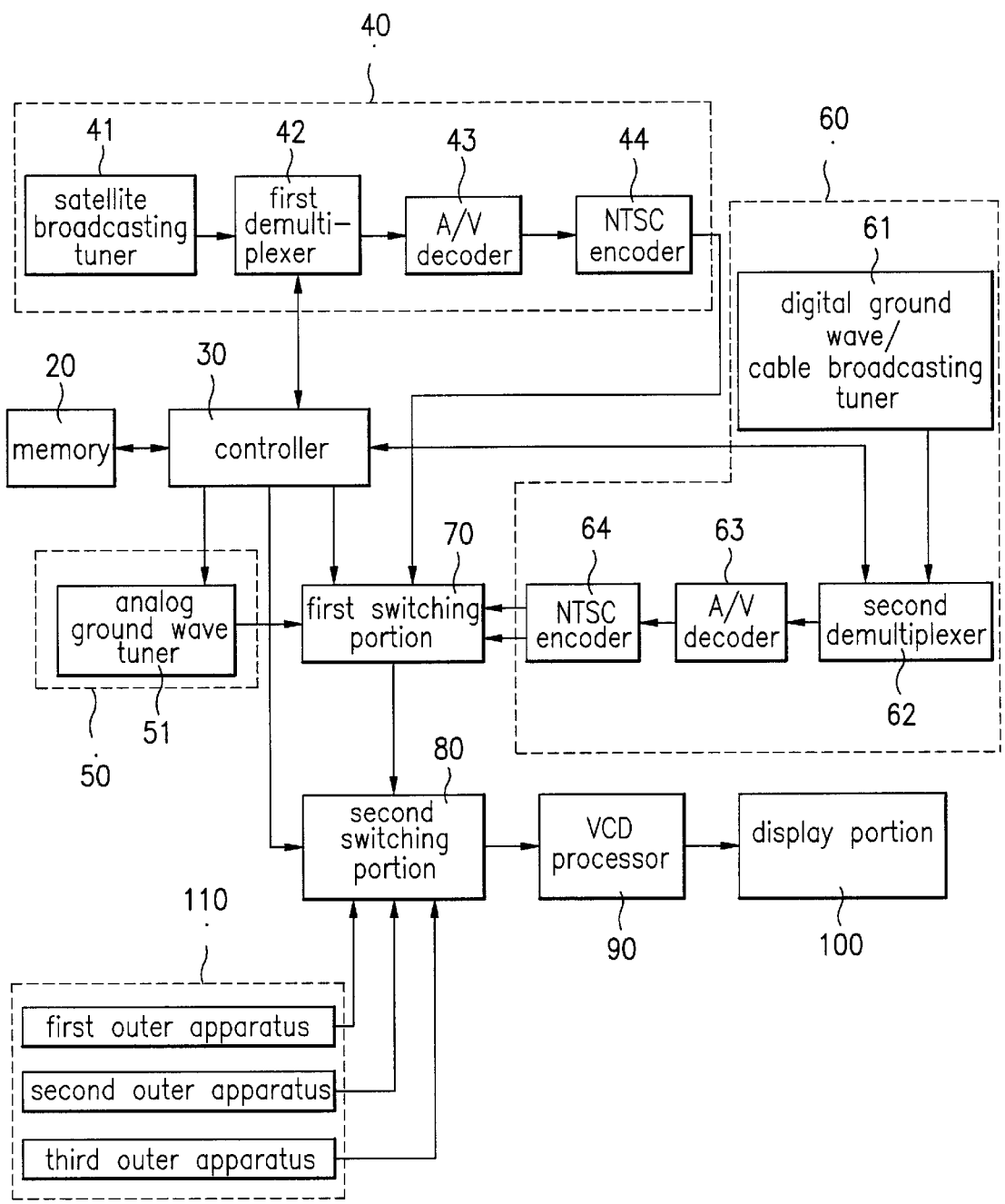
FIG. 3 is a block diagram illustrating a channel managing apparatus for a digital/analog TV according to the present invention.

As shown in FIG. 3, a channel managing apparatus for a digital/analog TV according to the present invention includes a memory 20 for storing tabled channel information of all the broadcasting signals including digital/analog broadcasting signals and a satellite broadcasting signal, a controller 30 for extracting data corresponding to a channel selected by a user if the user selects the channel and for outputting a control signal to tune the corresponding channel, a satellite broadcasting receiver 40 for receiving a satellite broadcasting signal in response to the control signal of the controller 30, a first switching portion 70 for selectively outputting one of outputs of an analog broadcasting receiver 50 and a digital broadcasting receiver 60, a second switching portion 80 for selectively outputting one of outputs of outer apparatuses 110 and the first switching portion 70 in response to the control signal of the controller 30, a VCD processor 90 for processing the output of the second switching portion 90 as image and deflection, and a display portion 100 for displaying the output of the VCD processor 90.

The satellite broadcasting receiver 40 includes a satellite broadcasting tuner 41 for selectively receiving a certain frequency band among received signals, a first demultiplexer 42 for demultiplexing a broadcasting signal received by the satellite broadcasting tuner 41 to image signal, voice signal and various control signals, a first A/V decoder 43 for decoding voice and image signals output from the first demultiplexer 42, and a first NTSC encoder 44 for encoding a digital image signal output from the first A/V decoder 43 to an NTSC signal and outputting the digital image signal as a luminous signal Y and a color signal C to be displayed on a TV or monitor.

The analog broadcasting receiver 50 includes an analog ground wave tuner 51 for selectively receiving a certain frequency band among analog ground wave broadcasting signals.

The digital broadcasting receiver 60 includes a digital ground wave/cable broadcasting tuner 61 for selectively receiving among digital ground wave broadcasting signals and cable broadcasting signals, a second demultiplexer 62 for demultiplexing broadcasting signals received by the digital ground wave/cable broadcasting tuner 61 to image signal, voice signal and various control signals, a second A/V decoder 63 for decoding voice and image signals output from the second demultiplexer 62, and a second NTSC encoder 64 for encoding a digital image signal output from the second A/V decoder 63 to an NTSC signal and outputting the digital image signal as a luminous signal Y and a color signal C to be displayed on a TV or monitor.

The satellite broadcasting tuner 41 receives a digital broadcasting signal and converts it to a base band signal. The first demultiplexer 42 demultiplexes broadcasting signals only corresponding to the channel selected by the user among signals output from the satellite broadcasting tuner 41 to image signal, voice signal and various control signals.

The first A/V decoder 43 recovers and outputs image and voice signals among signals selectively output from the first demultiplexer 42.

The first NTSC encoder 44 encodes the digital image signal to an NTSC signal and then outputs a luminous signal Y and a color signal C to be displayed on a TV or monitor.

The analog ground wave tuner 51 receives the analog broadcasting signal and converts it to a base band signal. The analog ground wave tuner 51 tunes the frequency corresponding to a channel selected by the user in response to the control signal of the controller 30.

The digital ground wave/cable broadcasting tuner 61 receives the digital ground wave broadcasting signal or the cable broadcasting signal and converts them to the base band signal.

The first switching portion 70 selectively outputs one of the ground wave received from the luminous signal Y/color signal C of the first NTSC encoder 44, the output signal of the analog ground wave tuner 51, and the luminous signal Y/color signal C of the second NTSC encoder 64 in response to the control signal of the controller 30.

The second switching portion 80 selectively outputs one of the output of the first switching portion 70 and the output of the outer input portion 110 in response to the control signal of the controller 30.

The VCD processor 90 performs image-processing and is amplification of the output signal of the second switching portion 80. The display portion 100 displays the image signal processed by the VCD processor 90 on the screen. At this time, the display portion 100 may be formed of CRT, LCD, or PDP, which actually realizes images.

The memory 20 stores tabled data of the digital/analog ground wave broadcasting signal, the cable broadcasting signal, and the satellite broadcasting signal.

At this time, the data corresponding to the digital/analog ground wave broadcasting signal, the cable broadcasting signal, and the satellite broadcasting signal includes a channel number, the tuning frequency, a relay terminal number, and a network ID. The channel number and the tuning frequency are assigned to the analog ground wave broadcasting signal while the channel number, the tuning frequency, the relay terminal and the network ID are assigned to the digital ground wave broadcasting signal and the cable and satellite broadcasting signal.

Channel information are stored in the memory 30 for the unit of each broadcasting type as shown in Table 1.

| Channel number | Channel information |
|---|---|
| 1 | A(1) = tuning frequency |
| . | . |
| . | . |
| . | . |
| 1 | A(1) = tuning frequency |
| 1 + 1 | C(1 + 1) = network ID/relay terminal number/channel number |
| . | . |
| . | . |
| . | . |
| m | C(m) = network ID/relay terminal number /channel number |
| m + 1 | T (m + 1) = network ID/relay terminal number/channel number |
| . | . |
| . | . |
| . | . |
| n | T(n) = network ID/relay terminal number/channel number |
| n + 1 | S(n + 1) = network ID/relay terminal number/channel number |
| . | . |
| . | . |
| . | . |
| 0 | S(o) = network ID/relay terminal number /channel number |

As shown in Table 1, the analog ground wave broadcasting channel is assigned to the channel number 1~1, the cable broadcasting channel is assigned to the channel number 1+1~m, the digital ground wave broadcasting channel is assigned to the channel number m+1~n, and the satellite broadcasting channel is assigned to the channel number n+1~0.

Each broadcasting channel mapping method will be described with reference Lo FIG. 4.

Figure 4:
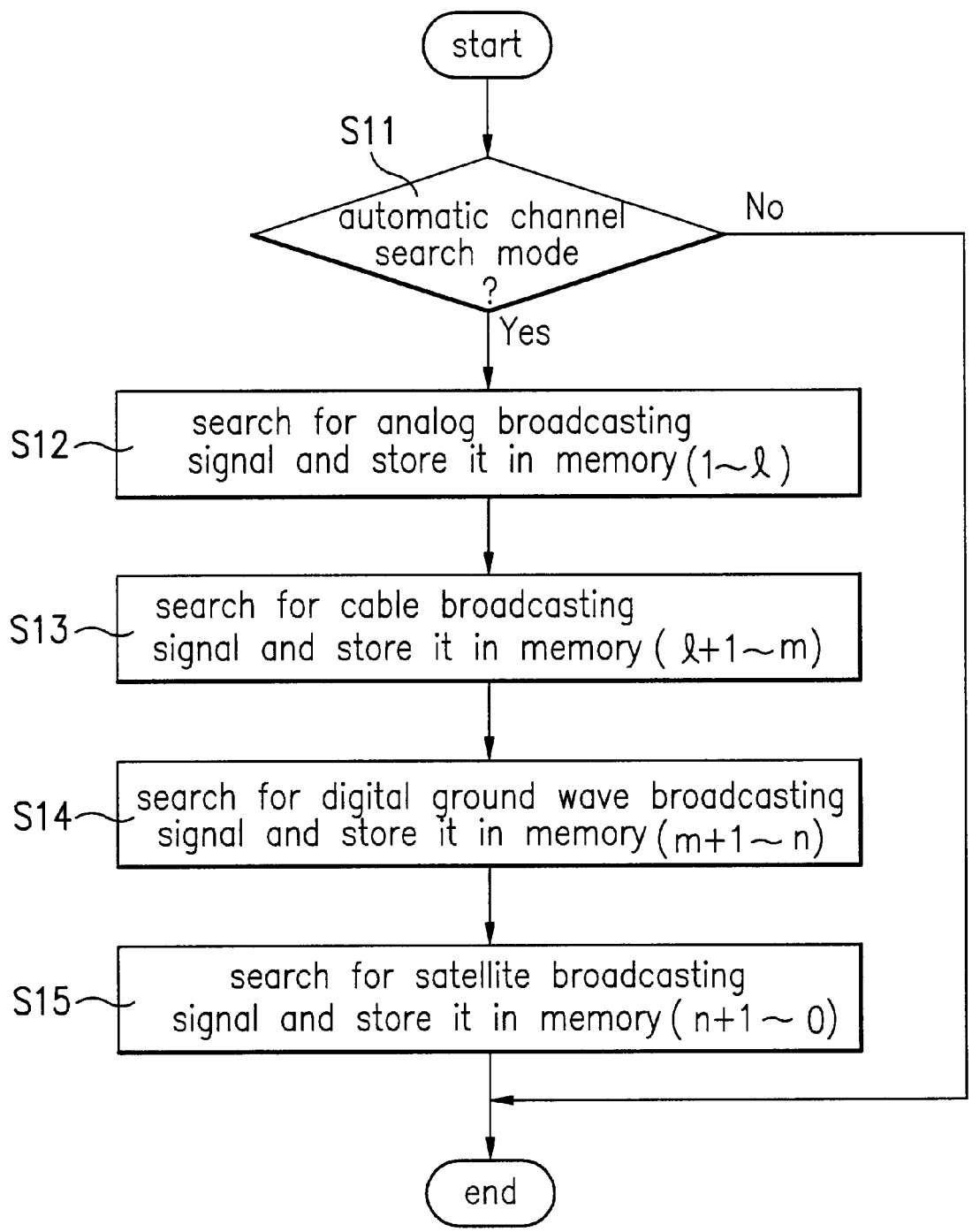
FIG. 4 is a flow chart illustrating a channel mapping method for a digital/analog TV according to the present invention.

FIG. 4 is a flow chart illustrating a broadcasting channel mapping method for a digital/analog TV according to the present invention.

Referring to FIG. 4, it is determined whether or not an automatic search mode is entered (S11). If the automatic search mode is entered, the analog ground wave broadcasting signal is searched and the channel number 1~1 and the tuning frequency are stored (S12).

The cable broadcasting signal is searched, and the network ID, the relay terminal number and the channel number 1+1–m are stored (S13).

Subsequently, the digital ground wave broadcasting signal is searched, and the network ID, the relay terminal number, and the channel number m+1–n are stored (S14).

Furthermore, in case of the satellite broadcasting, a program association table (PAT) is extracted from the first demultiplexer 22 and the network ID, the relay terminal number and the channel number n+1–0 are stored (S15)

One embodiment in which the broadcasting signal is searched as above and then stored in a corresponding memory area will be described with reference to FIG. 5.

Figure 5:
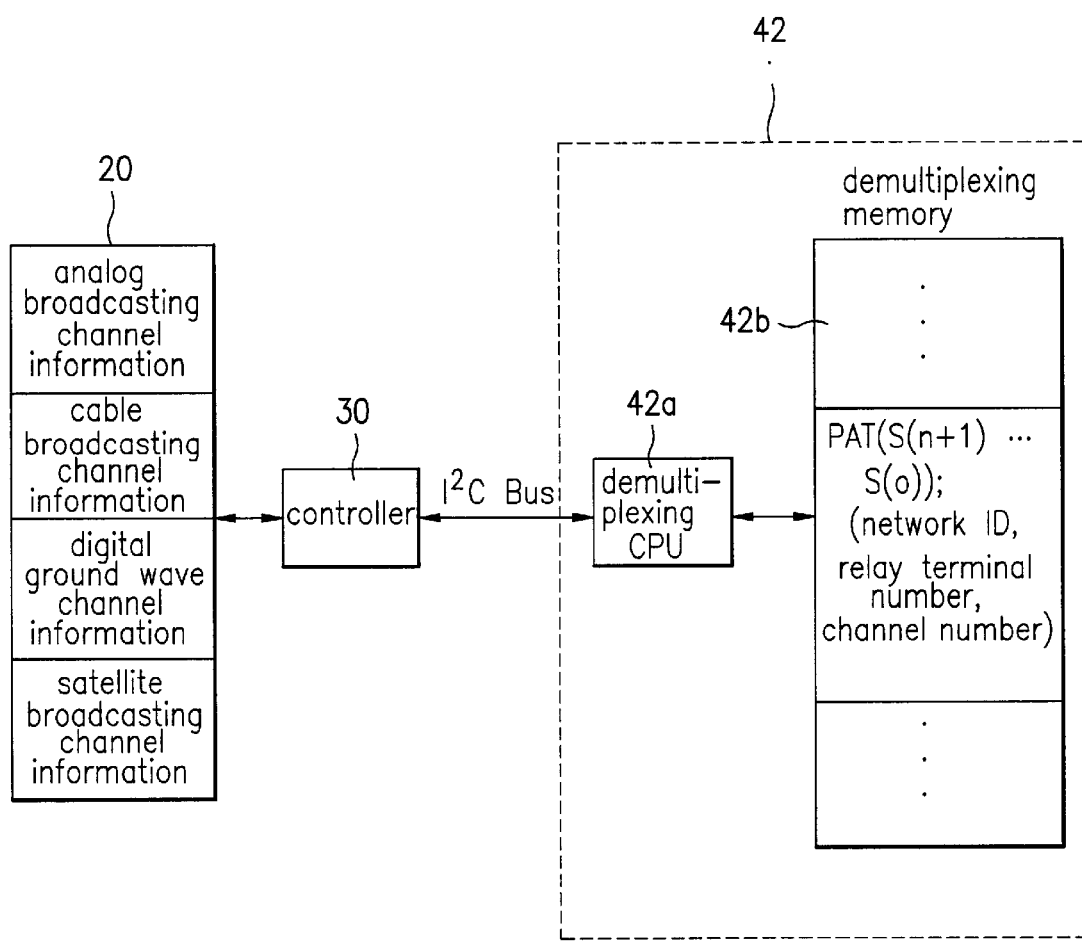
FIG. 5 shows an embodiment according to the present invention.

FIG. 5 shows a step of storing channel information of the satellite signal in the memory.

Referring to FIG. 5, a received broadcasting signal is searched so that channel information corresponding to each channel are transferred to a first demultiplexing memory 42b in the first demultiplexer 42 to make a PAT.

The network ID, the relay terminal number and the channel number stored in the PAT are transferred to an area in the memory 20, which stores satellite broadcasting channel information through data communication between the first demultiplexer CPU 42a and the controller 30. At this time, the network ID distinguishes whether the selected broadcasting channel is the satellite broadcasting, the cable broadcasting, or the digital is ground wave broadcasting. Each broadcasting channel information are assigned to the channel number 1~0 in the order of the cable broadcasting, the digital ground wave broadcasting and the satellite broadcasting and stored in a certain area of the memory 20.

Figure 6:
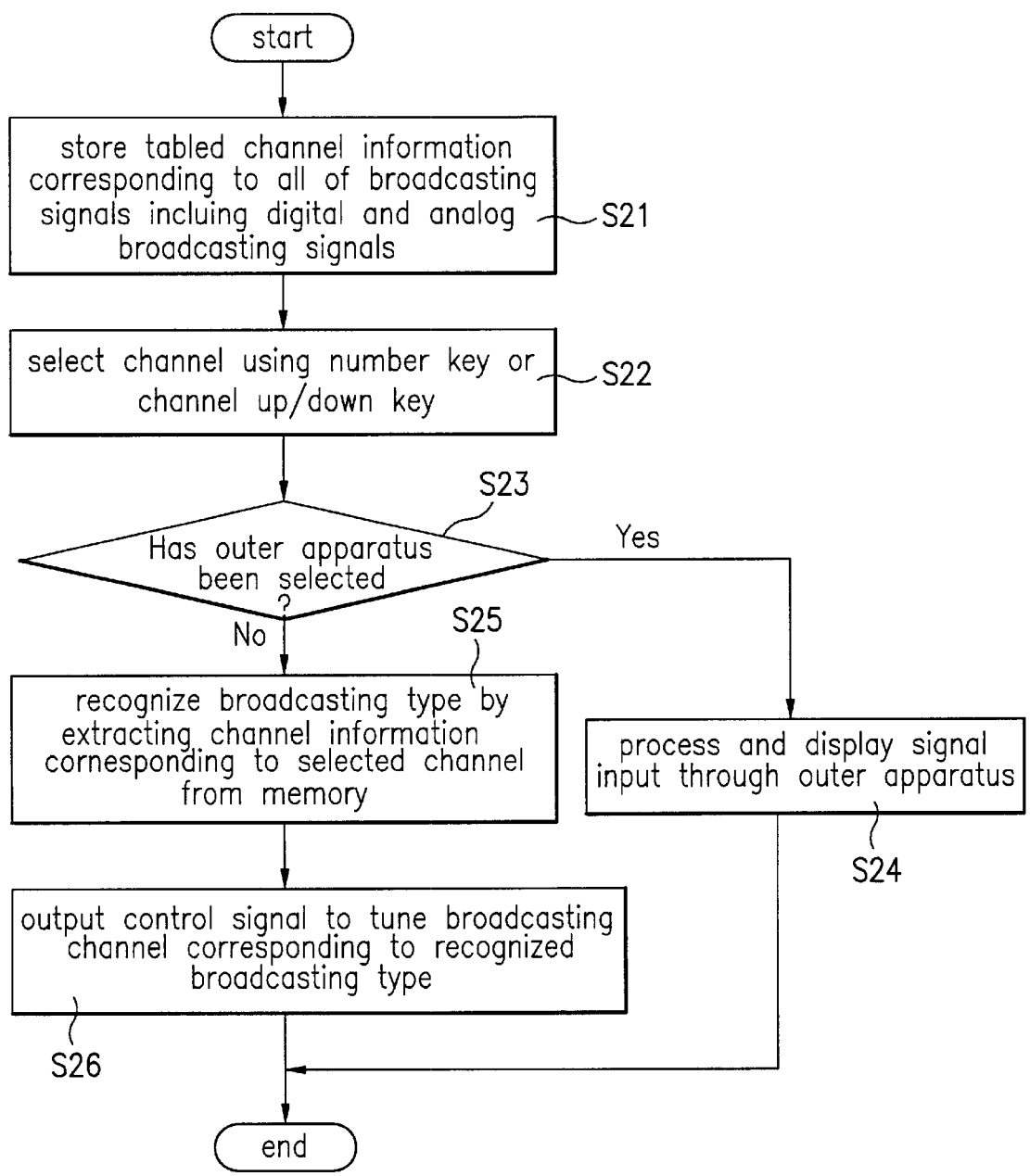
FIG. 6 is a flow chart illustrating a channel managing method for a digital/analog TV.

The channel managing method for the aforementioned digital/analog TV will be described with reference to FIG. 6.

First, channel information corresponding to all the broadcasting signals including the digital and analog broadcasting signals are tabled and stored in the memory (S21). A channel is selected by a number key or a channel up/down key (S22). It is determined whether or not a user has selected outer apparatuses (S23). As a result, if the user has selected outer apparatuses, signals input through the outer apparatuses are processes image and deflection of the signals input through the outer apparatuses (S24).

Meanwhile, if the user has not selected outer apparatuses, channel information corresponding to a selected channel are extracted from the memory so that the user recognizes a selected broadcasting type (S25).

The control signal is output to tune a broadcasting channel corresponding to the recognized broadcasting type (S26).

At this time, in recognizing the broadcasting type extracted from the memory, if an input channel number exists between 1 and 1, it is recognized as an analog broadcasting channel, if the input channel number exists between 1+1 and m, it is recognized as a cable broadcasting channel, if the input channel number exists between m+1 and n, it is recognized as a digital ground wave broadcasting channel, and if the input Channel number exists between n+1 and 0, it is recognized as a satellite broadcasting channel. Then, a corresponding frequency is controlled to tune the recognized channel.

Furthermore, in changing channel information such as the channel number to tune the digital channel, a new channel information is transferred to the controller and channel information corresponding to an assigned channel number is renewed.

The channel managing apparatus and method for the digital/analog TV according to the present invention has the following advantages.

It is possible to automatically tune a corresponding channel regardless of the broadcasting type when the user selects a desired channel using a number key or a channel up/down key. In addition, it is possible to select a particular service by increasing or reducing a channel number when the same service is transferred through various channels. Therefore, the user can use such service more conveniently.

It will be apparent to those skilled in the art that various modifications and variations can be made in the channel managing apparatus and method for the digital/analog TV according to the present invention without departing from the spirit or scope of the invention. Thus, it is intended that the present invention covers the modifications and variations of the invention provided they come within the scope of the appended claims and their equivalents.

What is claimed is:

1. A channel managing apparatus for a digital/analog TV comprising:
   a memory;
   a controller coupled to said memory, and configured to,
      sequentially detect each TV signal of a plurality of sources to obtain a set of TV signals, wherein the set of TV signals has more than one broadcast format,
      extract broadcast format information from the detected TV signals indicating the broadcast format of a detected TV signal,
      decrease channel tuning time by assigning channel information including at least a channel number to the detected TV signals based on each broadcast format of the detected TV signal to form a linear sequence of channels ordered and grouped by broadcast format in said memory,
      store the assigned channel information in said memory,
      receive a user input selecting a TV channel,
      extract corresponding assigned channel information from said memory in accordance with said user input, and
      output a control signal in accordance to the extracted corresponding assigned channel information to tune the selected TV channel;
   a first switching portion coupled to said controller and configured to select and output one of the plurality of sources including each of a digital broadcasting receiver and an analog broadcasting receiver; and
   a signal processing and display portion coupled to said first switching portion and configured to process and display an output signal of said first switching portion, wherein the controller determines the broadcast type based on a linear location in the linear sequence of channels corresponding to a channel determined by the user input, wherein the controller is configured to assign portions of said linear sequence of channels to the same broadcast format regardless of a broadcaster's prescribed channel ordering.

2. The channel managing apparatus for a digital/analog TV as claimed in claim 1, wherein a tuning frequency is assigned to the channel number corresponding to the analog broadcasting signal.

3. The channel managing apparatus for a digital/analog TV as claimed in claim 1, wherein a tuning frequency, a relay terminal number and a network ID are assigned to the channel number corresponding to the digital broadcasting signal.

4. The channel managing apparatus for a digital/analog TV as claimed in claim 1, further comprising a second switching portion for selecting an output signal of outer apparatuses or the output signal of the first switching portion in response to the control signal of the controller and applying the selected signal to the signal processing and display portion.

5. The channel managing apparatus for a digital/analog TV as claimed in claim 4, wherein the digital broadcasting receiver includes a satellite broadcasting receiver, a digital ground wave broadcasting receiver and a cable broadcasting receiver.

6. The channel managing apparatus for a digital/analog TV as claimed in claim 5, wherein the plurality of assigned channel information stored in the memory includes a plurality of channel numbers, tuning frequency data corresponding to each channel, and a network ID for distinguishing broadcasting types.

7. The channel managing apparatus for a digital/analog TV as claimed in claim 6, wherein the controller controls a corresponding tuning band width of the broadcasting receiver by tuning frequency data stored in the memory.

8. The channel managing apparatus for a digital/analog TV as claimed in claim 7, wherein the user's desired channel is selected using a channel up/down key to reduce a number of broadcast type transitions.

9. The channel managing apparatus of claim 1, wherein the sequential detection of each TV signal and the assigning of the channel information occurs without user intervention.

10. The channel managing apparatus of claim 1, wherein the controller automatically sequentially detects and assigns channel information.

11. A method of managing broadcasting channel information in a digital/analog TV, comprising:
   determining whether an automatic detection mode for detecting broadcasting signals is set by a user, wherein if the automatic detection mode is set, a channel information set is automatically determined by:
      detecting a set of analog ground-wave broadcasting signals and storing their channel information sets with a first newly assigned set of channel numbers in a memory;
      detecting a set of cable broadcasting signals and storing their channel information sets with a second newly assigned set of channel numbers in said memory;
      detecting a set of digital ground-wave broadcasting signals and storing their channel information sets with a third newly assigned set of channel numbers in said memory; and
      detecting a set of satellite broadcasting signals and storing their channel information sets with a fourth newly assigned set of channel numbers in said memory;
   receiving a first user input selecting a desired TV channel;
   determining whether a second user input is received, wherein said second user input selects an external device that produces a non-broadcasting signal,
      wherein if said external device is selected, said non-broadcasting signal is displayed on a display device, and
      wherein if said external device is not selected, a channel information set corresponding to either the automatically determined channel information set or a predetermined channel information set from said memory is extracted and a corresponding broadcasting signal is displayed on said display device in accordance with said extracted channel information set.

12. The method of claim 11, wherein each channel information set of said analog ground-wave signals includes a tuning frequency.

13. The method of claim 11, wherein each channel information set of said cable broadcasting signals includes a network identification and a relay terminal number.

14. The method of claim 11, wherein each channel information set of said digital ground-wave signals includes a network identification and a relay terminal number.

15. The method of claim 11, wherein each channel information set of said satellite broadcasting signals includes a network identification and a relay terminal number.

16. The method of claim 11, wherein said desired TV channel is selected using number keys or a channel up/down key.

17. The method of claim 11, wherein all of said first, second, third and fourth newly assigned sets of channel numbers are sequentially ordered.

18. The method of claim 11, wherein said channel information sets of said satellite broadcasting signals are extracted from a Program Association Table (PAT) stored in a satellite broadcasting signal receiver.

19. The method of claim 11, wherein a broadcasting format of said broadcasting signals being displayed is recognized using said first user input.

20. The method of claim 11, wherein the external device is selected and produces a non-broadcasting signal and wherein the displaying of said non-broadcasting signal on the display device further comprises storing a fifth newly assigned channel for the external device's non-broadcasting signal, wherein the fifth newly assigned channel is not stored in said memory.

* * * * *